July 26, 1938.  F. H. STERN  2,125,261
BEER COOLING AND DISPENSING SYSTEM
Filed Oct. 24, 1936   2 Sheets-Sheet 2
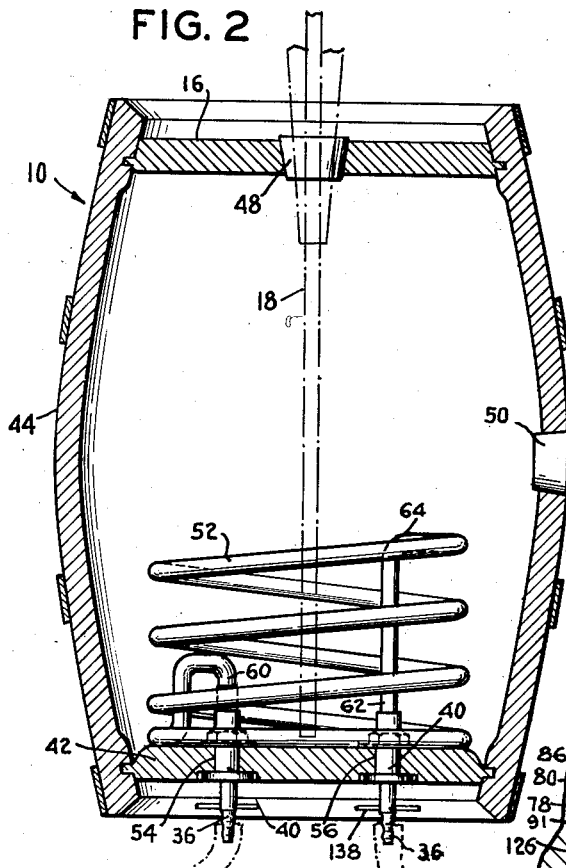
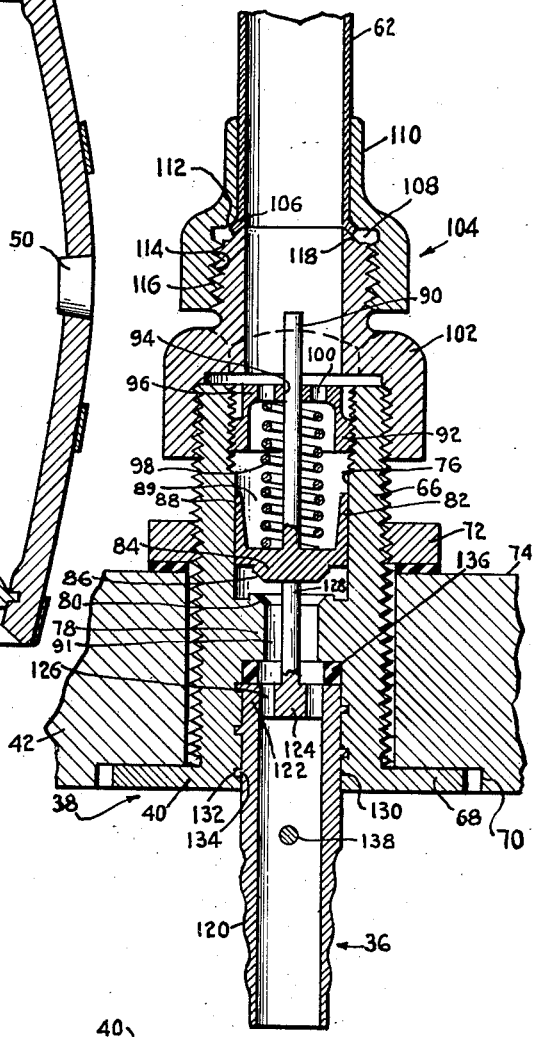
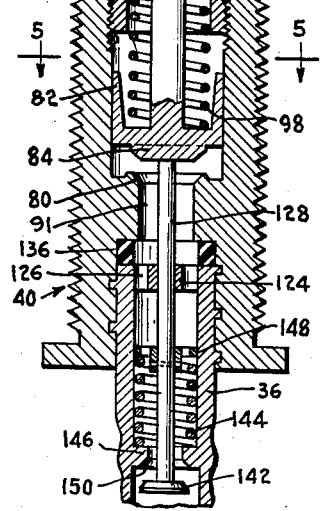
INVENTOR.
FRED H. STERN
BY Henry L. Burkitt
ATTORNEY.

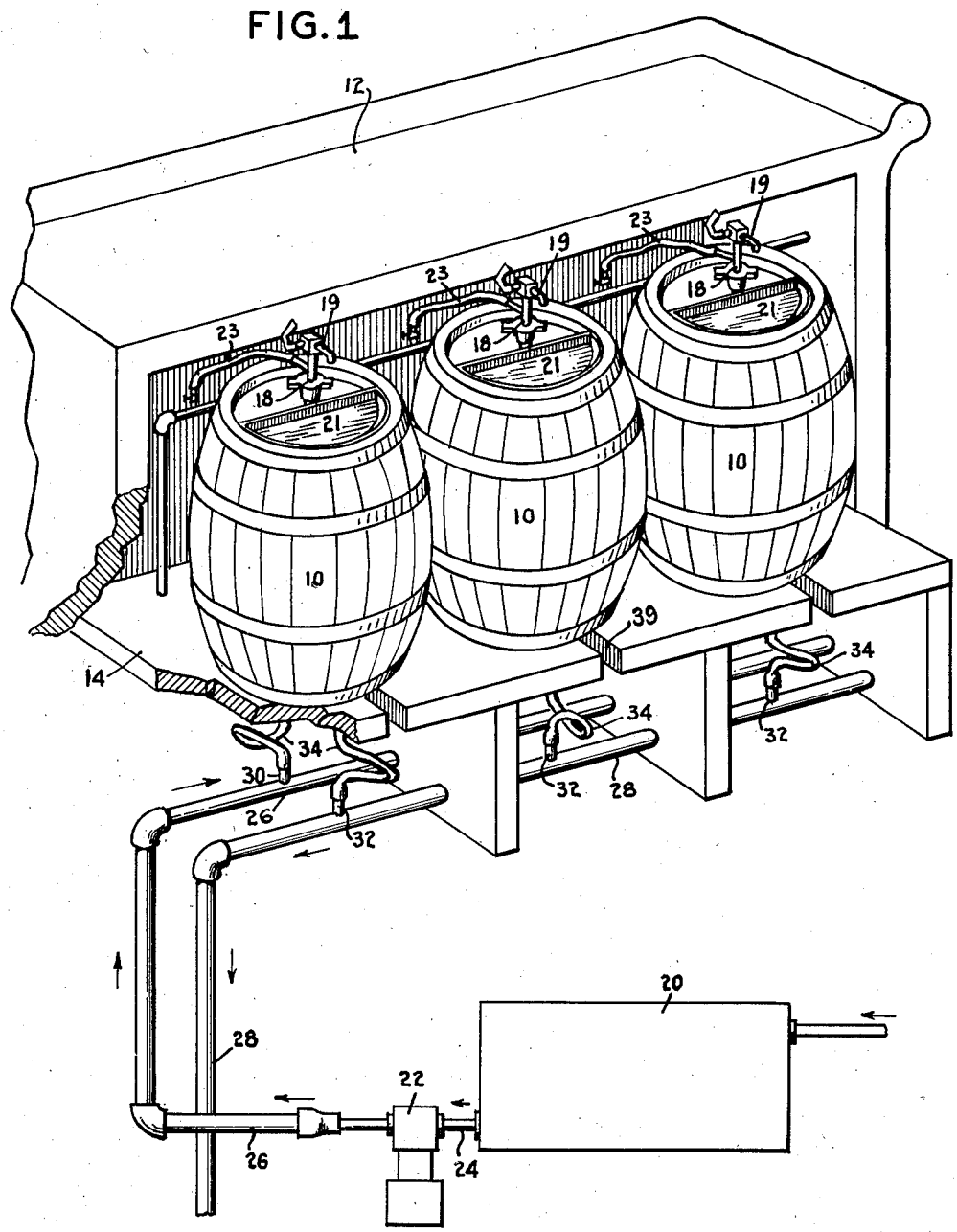

Patented July 26, 1938

2,125,261

UNITED STATES PATENT OFFICE 2,125,261

BEER COOLING AND DISPENSING SYSTEM

Fred H. Stern, Mount Vernon, N. Y., assignor to Henry L. Burkitt, New York, N. Y.

Application October 24, 1936, Serial No. 107,349

19 Claims. (Cl. 62—141)

This invention relates to a beer cooling and dispensing system.

Customarily, in handling draught beer, kegs are filled with it, and the kegs are then transported to the place where the beer is to be dispensed. In some cases, the kegs may be placed in a cooler so that the whole quantity of the beer may be maintained at a substantially low temperature until the keg is to be used. Then the keg is rolled out of the refrigerator, and a draft rod driven through a bung in one of the heads. The draft rod provides for the application of gaseous pressure to the interior of the keg to drive the contents out of the keg, the draft rod also making provision for the connection of a conduit to lead the contents of the keg to a dispensing faucet. The path of the beer from the keg to the faucet generally is through lengths of coils reposing in a refrigerating bath. One of the great defects of such systems is the accumulation in the coils of sediment and other impurities which gradually impart to the beer passing through the coils a distinctive, unpleasant, and unhealthy condition.

The invention is directed towards a beer cooling and dispensing system from which has been eliminated the passage through a cooling coil, or any other similar conduits in which any accumulations of the type indicated may occur, of the beverage to be dispensed. Furthermore, the invention contemplates a cooling and dispensing system for beer from which has been eliminated the necessity for any preliminary cooling of the kegs themselves, and by means of which system cold beer may, substantially at all times, be drawn without loss.

At the brewery, the beer, after its preparation, and before being filled into the keg, is refrigerated; then, in its refrigerated condition, it is conducted into the keg by a nozzle which generally is inserted through a bung hole located substantially medially of the height of the keg. Before the beer has had any opportunity to warm up, or to effervesce, or in any way to form a froth within the keg, the bung is driven into place, and thus the keg remains sealed until it is ready to be placed into a system for dispensing the beverage. In the customary method of use, when the draft rod is driven into the keg, it is driven into a keg which has passed through several stages of temperature change so that the beer has, at different times, been under different internal pressures.

It is an object of the invention to provide a system of cooling and dispensing beer of the type indicated in which the cooling unit for the beer is substantially an integral part of the beer keg, and wherein the keg is a separable part of the refrigerating system, and wherein the portion of the refrigerating unit within the keg must necessarily have both its ends coupled into the refrigerating system before refrigeration may proceed.

It is an object of the invention to provide, in a beer cooling and dispensing system, a refrigerating coil within the keg itself, through which keg is to be passed a refrigerating fluid, but through which coil no fluid can be passed unless both inlet and outlet connections are made to that coil.

It is an object of the invention to provide a beer cooling and dispensing system in which a beer keg has made a part thereof a cooling coil, and wherein the beer keg may be disposed with the inlet and the outlet to the coil disposed in the bottom head of the keg.

Other objects of this invention will hereinafter be set forth, or will be apparent from the description and the drawings, in which are illustrated certain elements considered pertinent for the demonstration of the invention.

The invention, however, is not intended to be restricted to any particular method of operation, construction, or arrangement of parts, or any apparatus herein shown and described, or to any particular application of any such apparatus or method, or to any specific manner of use, or to any of various details thereof, herein shown and described, as the same may be modified in various particulars, or be applied in many varied relations, without departing from the spirit and scope of the claimed invention, the elements herein illustrated and described being merely types showing some of various forms the invention might take for practical purposes.

On the drawings in which the same reference characters refer to the same parts throughout, and in which are shown the elements mentioned:

Fig. 1 is a view in perspective, illustrating the manner in which the invention has been applied to a simple counter beer dispensing assembly, portions of the assembly being shown diagrammatically;

Fig. 2 is a view to illustrate the construction of a keg embodying certain features of the invention, the view being of a cross-section, taken vertically along the vertical centerline of the keg, the connecting ends of the detachably coupled conduits being illustrated, together with the coil in the keg, in elevation, and the conduits themselves and the draft tube, by broken lines;

Fig. 3 is a cross-sectional view of a detail of the keg assembly shown in Fig. 2, the view being taken vertically through one of the coupling systems and being to an enlarged scale, portions of the valve stem and the valve push-rod being shown in elevation;

Fig. 4 is a cross-sectional view, to a reduced scale, of a modified form of a coupling system for further illustration of the invention; and Fig. 5 is a partial cross-sectional view, on the line 5—5 of Fig. 4, illustrating the guiding means for the valve in the keg portion of the coupling system.

In the system shown on the drawings, a number of kegs 10 are seen disposed at a counter 12 over which the beer to be dispensed is delivered. The kegs are supported upon a platform 14. Through the upper head 16 of one or more of these kegs are driven individual draft rods 18. Such draft rods are just long enough, as a single unit, to extend substantially to the bottom of the keg, and to extend to a position at about the level of the top of counter 12, at which point a beer dispensing nozzle 19 is secured. By reason of the height added to the keg by platform 14, the extension of draft rod 18 beyond head 16 is of a low order. When the keg is being emptied through nozzle 19, in the usual manner of dispensing, a drip pan 21 may be disposed upon head 16. The distance through which drippings must fall can be seen to be slight. The portion of draft rod 18 within the keg is made up of a pair of concentrically disposed tubes in the customary manner, and, therefore, requires no description here. One tube which reaches down to the bottom of the keg is the liquid duct, to which nozzle 19 is connected. The other tube does not extend any appreciable distance within the keg, being connected, externally of the keg, to a duct 23 to lead gases under pressure into the keg, to effect the discharge of the beer from the keg. The elements for and the method followed in inserting a rod into the keg is well known in the art and will not be described here.

The system includes a tank 20 to contain a cooling medium which, in this case, may be water or some other fluid, in turn chilled by a suitable refrigerating plant (not shown). For the purposes of this invention, in view of the temperature to which the beer is to be cooled, plain water may be used. However, where the system involves rapid dispensing of the beer, a fluid refrigerant capable of attaining a lower temperature than water without solidification may be that contained in tank 20. A circulating pump 22 may be connected to the outlet 24 from tank 20, and in turn deliver the refrigerating fluid, under pressure, to a supply header 26. This supply header, together with a drain header 28, which may return the fluid to tank 20, may be positioned within platform 14, the supply header being provided with a plurality of outlet connections 30, and the drain header being provided with a similar number of inlet connections 32. Flexible hose 34 may be attached to each of the connections, and, at the free end of each hose, there may be secured the plug 36 of a coupling 38. The hose, when the kegs are set up in position, or removed from the platform, is easily slipped in and out of slots 39 in the platform, provided for that purpose. Sleeve 40, complementary to plug 36, is mounted in a head 42 of the keg.

Keg 10 may be of any generally desired construction. The construction shown in the drawings is that of the conventional keg, in which body 44 is formed of staves, and, in the usual manner, is bound together by hoops. Heads 16 and 42 are mounted in position at the time the keg is hooped. The usual construction includes the provision, in at least one of the heads, of a bung hole 48 through which draft rod 18 is driven when the keg is ready for the delivery of its beer. In the medial section of body 44 is located the filling bung hole 50, also closed by a suitable bung. In the filling of the keg at the brewery, the keg is laid upon its side with bung hole 50 uppermost. The filling rod is inserted into the keg through this bung hole, with the end of the rod resting against the juxtaposed portion of the body of the keg. In this manner, agitation of the beer and consequent frothing are reduced to a minimum. The beer is brought to the delivery rod in a refrigerated condition, and, as soon as the keg has been filled up to the bung hole, the filling rod is removed and the bung driven into position before the beer has had any opportunity to expand, effervesce, or otherwise become "wild."

A cooling coil 52 is made substantially an integral part of the keg, in accordance with this invention. In this case, the coil is shown as mounted in connection with head 42, which is the bottommost head when the keg is arranged, as shown in the drawings, with the draft rod driven through bung hole 48. Two openings 54 and 56 have been provided in head 42. A sleeve 40 has been mounted at each of these openings. To these sleeves have been connected the ends 60 and 62 of coil 52. The manner in which the coil is connected to the sleeves, and the manner in which these sleeves are mounted in connection with head 42, are both directed to the ultimate result of eliminating vibration of the coil with relation to head 42, and to eliminate, to as great a degree as possible, the torque applied to the several units of the keg when the keg is handled. Thus, for instance, the total extent of coil 52 is limited so that its outermost convolution 64 does not extend beyond bung hole 50. Thus, not only is the coil less of a factor in strains set up and stresses applied during the handling of the keg, but, further, no portion of the coil is in a position to be engaged by the filling rod when inserted through bung hole 50.

One type of construction for carrying out certain purposes of the invention is shown in Fig. 3. In that case, sleeve 40 may be a cast member 66 having a substantially cylindrical body ending in a flange 68. Head 42, at openings 54 and 56, may have a countersink 70 to receive flange 68. The body of member 66 may be threaded up to flange 68 in order to receive a lock nut 72 which is turned up into engagement with the inner face 74 of head 42, thus to lock sleeve 40 in position.

Member 66 may be provided with a bore 76 across which may extend a partition wall 78 in which may be formed a valve seat 80. To engage this seat is provided a sliding valve 82. Valve 82 may be composed of a head 84 having a seat-engaging portion 86 from which extend rearwardly a plurality of guide lugs 88. Between the guide lugs are found open spaces 89 which extend up to seat-engaging portion 86, so that, when portion 86 is moved rearwardly out of engagement with seat 80, open passage will be provided past valve 82, and then through passage 91 through wall 78.

Lugs 88 guide valve 82 for sliding movement within bore 76.

Extending rearwardly from head 84 is a rod 90 which extends through a retainer 92, a cup-shaped member having threaded engagement with the threaded section of the wall of bore 76. Rod 90 extends and slides through an opening 94 in cross-wall 96 of the retainer. A spring 98 is engaged between cross-wall 96 and the inner face of head 84, being coiled around rod 90, and thus at all times urging head 84 into engagement with seat 80. In cross-wall 96 are a plurality of openings 100 around opening 94, so that fluid may flow freely into bore 76 up to seat 80.

Also, in engagement with the threaded outer face of member 66 is the nut 102 of a tube coupling 104. Coil 52 may be constructed in any desired manner, but preferably is made up from seamless tubing, bent to provide a substantially helical member. Ends 60 and 62 are bent out of the helix to extend towards openings 54 and 56, respectively. The extreme end edges 106 of ends 60 and 62 are belled out; each end edge is received within the bore 108 of a nut 110. The bore is enlarged to provide a shoulder 112 which is rounded and shaped to provide a seat against which may rest the belled-out end edge 106. Nut 102 is provided with an externally threaded section 114 to engage with the threaded section 116 of the enlarged portion of bore 108. The end face of threaded section 114 is provided with a conical extension 118 to seat within belled-out end edge 106, the flat portion of the end face cooperating with extension 118 to drive the belled-out end edge into locked and sealed relationship between nuts 102 and 110. In this manner, the two ends 60 and 62 of coil 52 are positively locked in position with relation to head 42. The total extent of sleeve 40 and the nuts is small in comparison to the total height of the coil. At the same time, the entire arrangement is substantially rigid and resistant to any shocks which may be directed to the coil and the associated parts in the handling of the keg.

Plug 36 may be provided with a corrugated tapering sleeve portion 120 for reception within hose 34. End 122 may be closed by a wall 124 provided with a plurality of openings 126. Extending from wall 124 may be a pin 128 of a length such that, when the plug is inserted into pocket 130, the section of bore 76 beyond partition wall 78, the pin will extend through passage 94 and engage with the outer face of head 84, and, with proper application of force to this plug, head 84 will be driven away from seat 80. In order properly to effect this opening of valve 82, and, at the same time, to seal the coupling against the passage of fluid other than through the system, pocket 130 may be provided with a steep thread 132, and the outer periphery of the plug, immediately at wall 124, with a complementary thread 134 to engage within thread 132. A flexible washer 136 may be retained within pocket 130. When plug 36 is to be assembled with sleeve 40, it is inserted into pocket 130 so that threads 132 and 134 engage. Any suitable means, such as prongs 138, then provide means to turn plug 36, driving wall 124 down against washer 136 and pressing it against partition wall 78 to seal the device against leakage of fluid. At the same time, pin 128 drives valve 82 so that its head is released from seat 80.

It will be noted, however, that the coupling of one plug to a sleeve will not be sufficient to open a passage through the coil, as the other coupling will remain closed. Thus, coupling the supply header to the coil will not result in fluid gushing over the premises if the manipulator failed to connect the other plug to its sleeve. Both plugs must be connected to the sleeves before any fluid may pass. It will also be noted that, when plugs are not inserted in the sleeves, the coil and its sleeves form a completely sealed unit from which fluid cannot leak. Thus, in handling the keg into and out of the premises, there is no opportunity to soil the premises by leakage of refrigerant. Furthermore, a refrigerant such as brine may be used without loss, as the keg, returned to the brewery, will there be filled without loss of the refrigerant, and then returned to the place where the beer is to be dispensed and connected into the system, again without any loss.

If desired, there may be provided a plug which also seals the headers against passage of fluid therefrom unless connected directly to a cooling coil in a head. For this purpose, as shown in Fig. 4, where the construction is substantially identical with that of Fig. 3, with the exception of these enumerated changes, rod 90 may be provided with a shoulder 140 to engage against wall 96. Pin 128, instead of being fixed in wall 124, may extend slidably through the wall and be a portion of a valve 142 slidable within plug 36. A spring 144, caught between a cross-wall 146, and a retainer 148 mounted on pin 128 provides means for normally driving valve 142 into engagement with a seat 150 in wall 146. Spring 144 is under a higher degree of compression than spring 98, so that pin 128 will first drive head 84 away from its seat until shoulder 140 engages cross-wall 96, whereupon, on continued movement of plug 36 into sleeve 40, pin 128 will be stopped and valve 142 will be lifted from its seat. On release of a plug from its sleeve, both valves, or, where one valve is used, that valve, will close, and further passage of fluid will cease. It can readily be understood that an arrangement such as shown in Fig. 4 need be applied only to the plug associated with supply header 26.

Thus there is provided a simple unit including the container for the beer and a coil for refrigerating such beer. The system may be arranged with the inlet and the outlet to the coil at the bottom head of the keg, as shown, without danger of leakage, even if accidentally one of the plugs should become free from the keg. A keg may be connected into the cooling system immediately upon its receipt, and the beer therein contained will be maintained cool until used. No long extension conduits are necessary within the keg, as the coil is located immediately adjacent the head through which the leads are directed.

Many other changes could be effected in the particular elements designed, and in the methods of operation and use, and in the apparatus, herein set forth, and in specific details thereof, without substantially departing from the invention intended to be defined in the claims, the description being merely of elements illustrating certain phases of the spirit of the invention.

What is claimed as new and useful is:—

1. A beer cooling and dispensing system, comprising a beer keg having end heads, the heads having a plurality of openings provided therein, a pair of couplings mounted to extend into the keg at a pair of the openings in one of the heads, a coil wthin the keg and extending and providing a path for fluid between the couplings, a source of cooling fluid, a supply header leading from the source, a drain header, a supply conduit connected to the supply header, a drain conduit connected to the drain header, and cooperating means carried by the couplings and the conduit ends to permit flow of fluid through the coil only when both conduits are connected to the couplings and to cut off flow through the coil when disconnected.

2. A beer cooling and dispensing system, comprising a beer keg having end heads, the bottom head having openings provided therein, a pair of couplings anchored to extend into the keg at openings in the bottom head, a coil extending between and having its ends secured to the couplings within the keg, a source of cooling fluid, a supply header leading from the source, a drain header, a supply conduit connected to the supply header, a drain conduit connected to the drain header, and cooperating means carried by the couplings and the conduit ends to permit flow of fluid through the coil only when both conduits are connected to the couplings and to cut off flow through the coil when disconnected.

3. A beer keg for use in a beer cooling and dispensing system, the beer keg having end heads, the bottom head having a pair of openings therein, a pair of couplings anchored to extend into the keg at the openings, and a coil extending between and having its ends secured to the couplings within the keg, the coil being concentrated closely adjacent the head at which the couplings are anchored.

4. A beer keg for use in a beer cooling and dispensing system, the beer keg having end heads, the bottom head having a pair of openings therein, a pair of couplings anchored to extend into the keg at the openings, a coil extending between and having its ends secured to the couplings within the keg, the coil in its entirety being located closely adjacent the head at which the couplings are anchored, and a draft rod extended into the keg through the top head.

5. A beer cooling and dispensing system, comprising a beer keg having end heads, one of the heads having a plurality of openings provided therein, a pair of couplings, each coupling consisting of separable members, one member of each coupling being mounted at an opening, a coil within the keg and communicating with the members mounted at the openings, a source of cooling fluid, a supply header leading from the source, a drain header, a supply conduit connected to the supply header and having one of the other members of a coupling secured to its end, and a drain conduit connected to the drain header and having one of the other members of a coupling secured to its end, the couplings comprising means to prevent flow of fluid through the coil unless the coupling members are united to form both couplings.

6. A beer cooling and dispensing system, comprising a beer keg having end heads, one of the heads having a plurality of openings provided therein, a pair of couplings, each coupling consisting of separable members, one member of each coupling being mounted at an opening, a coil within the keg and communicating with the members mounted at the openings, a source of cooling fluid, a supply header leading from the source, a drain header, a supply conduit connected to the supply header and having one of the other members of a coupling secured to its end, and a drain conduit connected to the drain header and having one of the other members of a coupling secured to its end, each coupling including valve means normally effective to prevent flow of fluid through the coil and made effective to open a passage for the flow of fluid only when the coupling members are united.

7. A beer keg adapted to be made part of a beer cooling and dispensing system, the beer keg having end heads, one of the heads having a plurality of openings provided therein, a member of a coupling being mounted to extend into the keg at each opening, a tubular coil within the keg, each member including a sleeve having a portion extending through the opening and having means engaging both faces of the head to lock the sleeve in position relative to the head, the ends of the tube being belled out, and means for engaging the belled-out ends of the coil and the sleeve and rigidly connecting the coil to the sleeves, the sleeves providing means for connecting the coil within the keg to a source of cooling fluid located externally of the keg and to a drain, the sleeves including means to prevent flow of fluid through the coil except when a direct connection is made between the sleeves and other members of the couplings associated with the source and the drain.

8. A beer keg adapted to be made part of a beer cooling and dispensing system, the beer keg having end heads, one of the heads having a plurality of openings provided therein, a member of a coupling being mounted to extend into the keg at each opening, a tubular coil within the keg, each member including a sleeve having a portion extending through the opening and having means engaging both faces of the head to lock the sleeve in position relative to the head, each sleeve including a valve seat, a valve slidable in the sleeve and normally maintained in engagement with the seat, the valve being constructed to be released from seat-engaging position by projection of a member extended through the mouth of the sleeve opening at the outer face of the keg, the ends of the tube being belled out, and means for engaging the belled-out ends of the coil and the sleeve and rigidly connecting the coil to the sleeves, the sleeves providing means for connecting the coil within the keg to a source of cooling fluid located externally of the keg and to a drain, the sleeves including means to prevent flow of fluid through the coil except when a direct connection is made between the sleeves and other members of the couplings associated with the source and the drain.

9. A beer cooling and dispensing system, comprising a beer keg having end heads, one of the heads having a plurality of openings provided therein, a pair of couplings, each coupling consisting of separable members, a tubular coil within the keg, a member of each coupling including a sleeve having a portion extending through an opening and into the keg and having means engaging both faces of the head to lock the sleeve in position relative to the head, each sleeve including a valve seat, a valve normally maintained in engagement with the seat, the coil communicating with the sleeves, a source of cooling fluid, a supply header leading from the source, a drain header, a supply conduit connected to the supply header and having one of the other members of a coupling secured to its end, and a drain conduit connected to the drain header and having one of the other members of a coupling secured to its end, the valves in the sleeves comprising means to prevent flow of fluid through the coil unless the coupling members are united.

10. A beer cooling and dispensing system, comprising a beer keg having end heads, one of the heads having a plurality of openings provided therein, a pair of couplings, each coupling consisting of separable members, a tubular coil within the keg, a member of each coupling including a sleeve having a portion extending through an opening and into the keg and having means engaging both faces of the head to lock the sleeve in position relative to the head, each sleeve including a valve seat, a valve normally maintained in engagement with the seat, the coil communicating with the sleeves, a source of cooling fluid, a supply header leading from the source, a drain header, a supply conduit connected to the supply header and having one of the other members of a coupling secured to its end, and a drain conduit connected to the drain header and having one of the other members of a coupling secured to its end, the valves preventing flow of fluid through the coil when the coupling members are separated, the other members of the couplings being insertible into the sleeves to engage the valves therein and drive them out of seated position.

11. A beer cooling and dispensing system, comprising a beer keg, a coil within the keg, a source of cooling fluid, a supply header leading from the source, a drain header, a supply conduit connected to the supply header, a drain conduit connected to the drain header, means for coupling the conduits to the coil to effect flow of cooling fluid through the coil, and means to seal the coil against movement of fluid therethrough except when the conduits have been coupled to the coil.

12. A beer cooling and dispensing system, comprising a beer keg, a coil within the keg, a source of cooling fluid, a supply header leading from the source, a drain header, a supply conduit connected to the supply header, a drain conduit connected to the drain header, means for coupling the conduits to the coil to effect flow of cooling fluid through the coil, and automatic means to cut off movement of fluid through the coil when either conduit is uncoupled from the coil.

13. A beer cooling and dispensing system, comprising a beer keg, a coil within the keg, a source of cooling fluid, a supply header leading from the source, a drain header, a supply conduit connected to the supply header, a drain conduit connected to the drain header, means for coupling the conduits to the coil to effect flow of cooling fluid through the coil, and means to seal the conduits and the coil against movement of fluid therethrough except when both conduits have been coupled to the coil.

14. A beer cooling and dispensing system, comprising a beer keg, a coil within the keg, a source of cooling fluid, a supply header leading from the source, a drain header, a supply conduit connected to the supply header, a drain conduit connected to the drain header, means for coupling the conduits to the coil to effect flow of cooling fluid through the coil, and means to seal the conduits against movement of fluid therethrough except when both conduits have been coupled to the coil.

15. A beer cooling and dispensing system, comprising a beer keg, a coil within the keg, a source of cooling fluid, a supply header leading from the source, a drain header, a supply conduit connected to the supply header, a drain conduit connected to the drain header, means for coupling the conduits to the coil to effect flow of cooling fluid through the coil, and automatic means to cut off movement of fluid through the coil and the conduits when either conduit is uncoupled from the coil.

16. A beer cooling and dispensing system, comprising a beer keg, a coil within the keg, a source of cooling fluid, a supply header leading from the source, a drain header, a supply conduit connected to the supply header, a drain conduit connected to the drain header, means for coupling the conduits to the coil to effect flow of cooling fluid through the coil, and automatic means to cut off movement of fluid through the coil and that conduit when either conduit is uncoupled from the coil.

17. A beer cooling and dispensing system, comprising a beer keg, a coil within the keg, a source of cooling fluid, a supply header leading from the source, a drain header, a supply conduit connected to the supply header, a drain conduit connected to the drain header, means for coupling the conduits to the coil to effect flow of cooling fluid through the coil, and automatic means to cut off movement of fluid through that conduit when either conduit is uncoupled from the coil.

18. A beer cooling and dispensing system, comprising a beer keg, a coil within the keg, a source of cooling fluid, a supply header leading from the source, a drain header, a supply conduit connected to the supply header, a drain conduit connected to the drain header, means for coupling the conduits to the coil to effect flow of cooling fluid through the coil, and automatic means to cut off movement of fluid through the conduits when either conduit is uncoupled from the coil.

19. A beer cooling and dispensing system, comprising a beer keg having end heads, the bottom head having openings provided therein, a pair of couplings anchored in certain of said openings and extending into the keg, the keg having a bung at its mid-section, a coil extending between and having its end secured to the couplings within the keg, the coil being wholly positioned in that portion of the keg between the bottom head and a plane parallel to the bottom head and through the mid-section of the keg, a source of cooling fluid, a supply header leading from the source, a drain header, a supply conduit connected to the supply header, a drain conduit connected to the drain header, and cooperating means carried by the couplings and the conduit ends to permit flow of fluid through the coil only when both conduits are connected to the couplings and to cut off flow through the coil when disconnected.

FRED H. STERN.